United States Patent [19]

Keijzer et al.

[11] 3,804,217
[45] Apr. 16, 1974

[54] PRESSURIZED SHOCK ABSORBER

[75] Inventors: Johan H. Keijzer, Hasselt; Willy R. J. Pierle, Tienen, both of Belgium

[73] Assignee: Monroe Belgium N.V., Sint-Truiden, Belgium

[22] Filed: Mar. 13, 1972

[21] Appl. No.: 234,052

[52] U.S. Cl................. 188/322, 277/153, 277/178, 277/183, 277/206 R
[51] Int. Cl............................................... F16f 9/36
[58] Field of Search ............ 188/322; 277/153, 178, 277/183, 206 R

[56] References Cited
UNITED STATES PATENTS

| | | | |
|---|---|---|---|
| 2,182,034 | 12/1939 | Oberstadt | 188/322 |
| 2,753,958 | 7/1956 | Whisler, Jr. | 188/322 X |
| 3,621,952 | 11/1971 | Long, Jr. | 188/322 |
| 2,332,763 | 10/1943 | Stewart | 188/322 X |
| 3,625,321 | 12/1971 | Lutz | 188/322 |

FOREIGN PATENTS OR APPLICATIONS

| | | | |
|---|---|---|---|
| 1,269,132 | 7/1961 | France | 188/322 |
| 900,061 | 12/1953 | Germany | 188/322 |
| 921,062 | 12/1954 | Germany | 188/314 |
| 719,896 | 10/1965 | Canada | 188/322 |
| 73,364 | 6/1960 | France | 188/322 |

Primary Examiner—George E. A. Halvosa
Attorney, Agent, or Firm—Harness, Dickey & Pierce

[57] ABSTRACT

A shock absorber comprising a generally cylindrical pressure cylinder, a piston reciprocally disposed within the cylinder, a piston rod affixed to the piston and extending coaxially from one end of the cylinder, a rod guide adjacent one end of the cylinder defining a central bore through which the piston rod extends, and a piston rod seal disposed axially outwardly from the rod guide and adapted for sealing engagement with the outer periphery of the piston rod.

9 Claims, 3 Drawing Figures

PATENTED APR 16 1974 3,804,217

PRESSURIZED SHOCK ABSORBER

SUMMARY OF THE INVENTION

It has heretofore been the practice in connection with the design of shock absorbers, particularly of the pressurized type, to mount the piston rod guide outside or axially outwardly from the associated rod seal which prevents the egress of hydraulic fluid from the interior of the shock absorber and the ingress of any road dirt, moisture, or other objectionable environmental elements interiorly of the unit. This design has been found to be undesirable, primarily in view of the fact that the rod guide is exposed to such objectionable environmental elements, and additionally, due to the fact that the outer end of the piston rod is not lubricated as it reciprocates within the rod guide since the rod seal prevents the hydraulic damping fluid from being communicated to the rod guide. An additional problem has been encountered in shock absorber designs incorporating rebound bumpers which are interposed between the rod seal and the associated piston, wherein the bumper might under certain circumstances, engage the rod seal during extreme rebound strokes.

A number of different approaches have been taken to these problems, including the provision of an antifriction bearing, such as a sleeve of teflon, interiorly of the rod guide in order to provide for lubrication thereof; however, heretofore known attempts to correct these problems have been unsuccessful. For example, the aforementioned teflon sleeves have been objectionable from the standpoint that there exists the risk of dirt entering between the outer periphery of the piston rod and the periphery of the teflon seal causing damage to the seal, resulting in premature failure of the shock absorber due to fluid leakage.

The present invention is intended to overcome the aforementioned objectionable characteristics through the provision of a novel shock absorber design wherein the rod seal is located axially outwardly from the associated rod guide. With this arrangement, the rod guide is properly lubricated by means of the hydraulic damping fluid within the shock absorber, and in addition, the rod seal prevents the ingress of any foreign material from the exterior of the shock absorber so as to positively prevent damage to the interface between the rod guide and piston rod. Furthermore, by orienting the rod guide interiorly of the associated piston seal, there is no change that the seal can be engaged and possible damaged by a rebound bumper which might be carried on the upper end of the piston.

It is accordingly a general object of the present invention to provide a new and improved shock absorber design.

It is a more particular object of the present invention to provide a new and improved shock absorber design wherein the seal for the shock absorber piston rod is located axially outwardly or exteriorly from the associated rod guide.

It is still another object of the present invention to provide a new and improved shock absorber of the above character which may be used in connection with pressurized, as well as multiple tube type shock absorber designs.

It is another object of the present invention to provide a new and improved shock absorber wherein adequate lubrication is provided interjacent the outer periphery of the piston rod and inner periphery of the rod guide.

It is still another object of the present invention to provide a new and improved shock absorber design wherein the rod seal prevents the ingress of foreign material into the interface between the piston rod and associated rod guide.

Other objects and advantages of the present invention will become apparent from the following detailed description taken in conjunction with the accompanying drawing.

DESCRIPTION OF THE PREFERRED EMBODIMENTS

Figures 1, 2, 3:
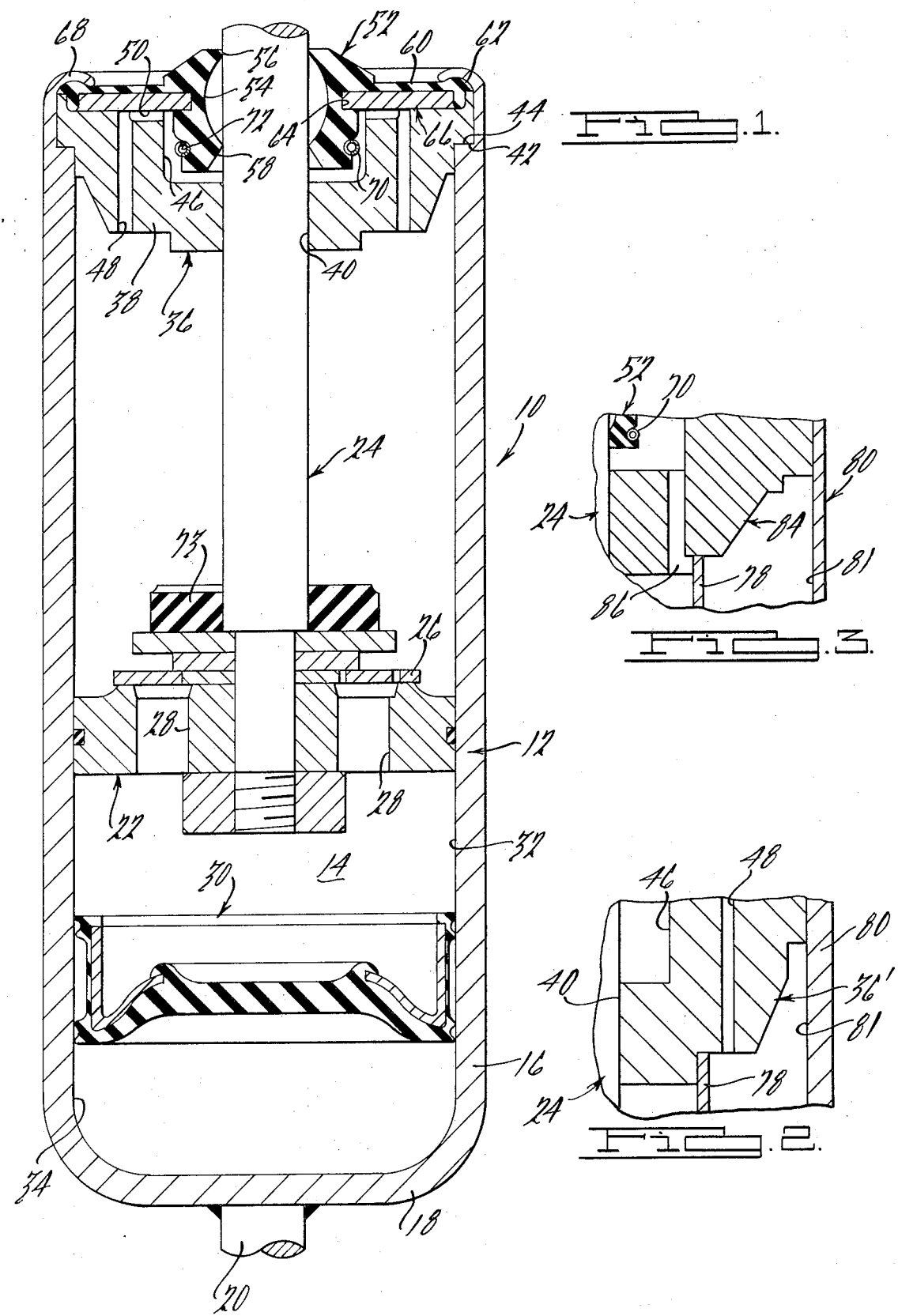
FIG. 1 is a longitudinal cross sectional view of a shock absorber incorporating the principles of the present invention.
FIG. 2 is an enlarged fragmentary view of a shock absorber design in accordance with a modified embodiment of the present invention.
FIG. 3 is an enlarged fragmentary view of yet another modified embodiment of the present invention.

Referring now in detail to the drawing, and in particular to FIG. 1 thereof, a shock absorber 10, in accordance with one preferred embodiment of the present invention, is shown generally as comprising an elongated pressure cylinder 12 which defines an internal compartment or cavity 14. The cylinder 12 comprises a generally uniform cross sectional cylindrical side wall 16 which terminates at the lower end thereof and in an integral end wall 18. Suitable attachment means, as representatively designated by the numeral 20, is fixedly secured as by welding or the like to the end wall 18 and is adapted to be secured to an associated sprung or unsprung portion of an automotive vehicle, such as to the vehicle frame or axle. Disposed interiorly of the cavity 14 is a reciprocal piston member 22 which is fixedly secured to one end of a coaxially extending piston rod 24, the outer end of the rod 24 also being provided with suitable attachment means (not shown) adapted to be secured to the other side of the vehicle portions, whereby the shock absorber 10 will be operatively disposed between and adapted to damp relative movement of the sprung portion of the vehicle relative to the unsprung portion therof.

The piston member 22 is provided with conventional valve means, representatively designated by the numeral 26, which is cooperable with suitable axially extending flow ports 28 in the piston member 22 for controlling the flow of hydraulic damping fluid from the upper end of the cylinder 12 to the lower end thereof during operation of the shock absorber 10. As is well known in the art, such damping fluid functions to dampen reciprocal movement of the piston 22 and piston rod 24 and hence, movement of the sprung portion of the associated vehicle. Disposed directly below the piston 22 is a floating partition means, generally designated by the numeral 30 which is adapted for sealing engagement with the inner periphery of the cylinder wall 16 and is intended to divide the lower end of the cavity 24 to a fluid chamber 32 and a lower gas chamber 34. As is well known in the art, the chamber 34 is adapted to be provided with a preselected quantity of pressurizable gas, such as nitrogen or the like, which is compressible upon downward movement of the partition means 30, whereby to accommodate for the volume of the damping fluid displaced as the piston rod 24 moves interiorly of the shock absorber 10.

In accordance with the principles of the present invention, the upper end of the cylinder 12 is provided with an annular rod guide member, generally designated by the numeral 36. The guide member 36 comprises a main body section 38 which is formed with a central annular bore 40 through which the upper end of the piston rod 22 extends and is slidable within. The outer periphery of the rod guide member 36 is formed with a stepped shoulder section 42 which is adapted to bear upon and be supported by a generally radially outwardly extending shoulder 44 formed around the inner periphery of the cylinder 12 adjacent the upper end thereof. The rod guide 36 is of a generally cup-like configuration and defines an internal cavity 46 which is communicable with the fluid chamber 32 by means of a plurality of circumferentially spaced generally vertically extending fluid passages 48 that are communicable at their upper ends with generally radially inwardly extending passages 50, with the result that during operation of the shock absorber 10, fluid will be forced upwardly within the chamber 32 through the passage 48 and 50 into the chamber or cavity 46, as will hereinafter be described in detail.

Further, in accordance with the principles of the present invention, disposed axially outwardly from the rod guide 36 is a rod seal, generally designated by the number 52. The seal 52 is fabricated of resilient deformable material, such as a natural or synthetic oil resistant rubber or the like. The seal 52 is formed with a centrally located bore 54 through which the upper end of the piston rod 24 extends. The upper end of the bore 54 is formed with a radially inwardly projecting wiper lip portion 56 which is adapted for wiping engagement with the outer periphery of the piston rod 24, and in a similar manner, the lower end of the bore 54 is formed with a radially inwardly projecting seal portion 48 which is adapted for fluid tight sliding engagement with the outer periphery of the piston rod 24. The seal 52 also comprises a generally radially outwardly extending web portion 60 that is integrally connected thereto and which terminates at the outer end thereof in a generally annular cross-section O-ring seal portion 62. Directly below the web portion 60, the seal 52 is formed with a radially inwardly extending annular notch or recess 64 which is adapted to nestingly receive the inner periphery of a generally ring shaped retaining or support element 66. The retaining element 66, as well as the seal 52, is adapted to be fixedly secured within the upper end of the shock absorber 10 by having a reduced thickness upper edge portion 68 spun, swaged or otherwise deformed radially inwardly over the top of the O-ring seal portion 62. With this construction, it will be seen that the single seal 52 not only serves to provide for a fluid tight engagement with the piston rod 24, but the radially outer O-ring seal portion 62 thereof serves to provide a fluid tight seal between the outer periphery of the rod guide member 36 and the associated cylinder 12. The seal portion 58 of the seal 52, by virtue of its natural resilient character, is intended to sealingly engage the outer periphery of the piston rod 24 to prevent against fluid egress therebetween; however, in order to supplement the resilient character of the seal 52, a suitable garter spring or the like 70 may be provided around an annular recess 72 axially aligned with the seal portion 58 in order to assure for positive sealing engagement therewith the piston rod 24, as will be appreciated by those skilled in the art.

It will be seen from the above described construction that by virtue of the fact that the seal 52 is mounted axially outwardly or exteriorly from the rod guide 36, the seal 52 will positively prevent any road dirt, moisture or the like from entering between the outer periphery of the piston rod 24 and inner periphery of the bore 40. In addition, it will be seen that substantial lubrication of the bore 40 will be achieved by virtue of the damping fluid that will be forced upwardly through the passages 48 and 50 into the chamber 46 during the rebound stroke of the shock absorber 10, whereby to minimize to the extreme any friction occurring between the outer periphery of the piston rod 24 and inner periphery of the bore 40. It will also be noted that the seal 52 is protected from engagement by any rebound bumper, such as the bumper 73, which might be carried on the upper end of the piston 22. It may be seen that by virtue of the fact that hydraulic damping fluid is permitted to flow around the outer periphery of the lower end of the seal 52 during a rebound stroke, said fluid will force the seal portion 58 of the seal 52 radially inwardly so as to greatly enhance the sealing characteristics thereof. This occurs by virtue of the fact that the area around the outer periphery of the seal 52 exposed to the chamber 46 is greater than the area around the inner periphery of the seal which is exposed to the pressure of the fluid within the chamber 46.

FIG. 2 illustrates a slightly modified embodiment of the present invention wherein the shock absorber 10 is provided with a rod guide 36' which is identical to the aforedescribed rod guide 36, with the exception that instead of being operatively associated with a pressure cylinder, such as cylinder 12, is adapted for operative association with a cylinder 78 of a multiple or two-tube shock absorber, which in addition to the cylinder 78, comprises a reserve tube or cylinder 80 that is arranged radially outwardly from the cylinder 78 and defines a fluid reservoir or cavity 81 therewith. In certain applications of the rod guide 36' and associated seal 52 in connection with multiple tube shock absorbers, such as that shown in FIG. 2, it may be desirable to provide for cooperation of the passages 48, 50 with the valving normally provided in the lower end of such multiple tube shock absorbers in selectively communicating damping fluid to and from the reservoir 81 during operation of the shock absorber. By properly designing the size of the passages 48, 50 and tolerances of the piston rod 24 and bore 40, fluid flow can be carefully controlled to supplement the action of the aforesaid valving, as will be appreciated by those skilled in the art.

FIG. 3 illustrates yet another embodiment of the present invention which includes a rod guide 84 which is generally similar in construction and operation to the above discussed guides 36 and 36', with the exception that the rod guide 84 is formed with a plurality of vertically extending passages 86 which are located radially inwardly from the cylinder 78 and are communicable at their upper ends with the cavity 46. The construction shown in FIG. 3 will find particularly useful application where it is desired to positively prevent any fluid connection between the interior of cylinder 78 and the cavity 81, as may be required in certain shock absorber designs.

While it will be apparent that the preferred embodiments illustrated herein are well calculated to fulfill the objections above stated, it will be appreciated that the present invention is susceptible to modification, variation and change, without departing from the scope of the invention.

We claim:
1. A shock absorber comprising,
a reciprocable piston assembly,
a piston rod affixed to said piston assembly and extending coaxially of the shock absorber,
a combination piston rod guide and end closure member for guiding reciprocable movement of said piston rod,
said guide member comprising a generally cylindrical body and being formed with a central cavity on the side thereof opposite said piston assembly,
a cylindrical housing member arranged coaxially of said piston rod and defining a chamber within which said piston assembly is reciprocally disposed,
said rod guide member extending radially across one entire end of said housing member and adapted to have the outer periphery fixedly secured to said one end of said housing,
a bore extending axially through said guide member coaxially of said cavity and through said piston rod extends,
a combination piston rod seal and wiper element disposed in part within said cavity and located on the axially outer side of said guide member from said piston assembly,
said element including an integral portion extending radially outwardly adjacent the axially outer side of said guide member and including a peripheral part engaged between said guide member and said housing member at the position wherein said members are fixedly secured to one another to provide a fluid-tight seal therebetween,
said element also including first and second axially spaced radially inwardly projecting sections adapted for sliding engagement with the outer periphery of said piston rod, with the axially outermost of said sections adapted to wipingly contact said piston rod and the axially innermost of said sections adapted to sealingly engage said piston rod,
first and second means located substantially interiorly of said cavity for exerting a radially inwardly directed force against the outer surface of said element for assuring positive engagement of said inwardly projecting sections thereof with the outer periphery of said piston rod,
said first means comprising an annular spring extending around the outer periphery of the portion of said element within said cavity,
said second means comprising pressurized hydraulic damping fluid communicated from said chamber and acting upon an effective area on the outer periphery of said element predeterminately greater than the area on the inner periphery of the element exposed to said fluid,
a first axially extending, generally circular cylindrical surface formed on said body of said guide member coaxially of said piston rod,
a second axially extending, circular cylindrical surface formed on said body of said guide member coaxially of said first surface and spaced radially therefrom,
one end of said housing member being fixedly secured to one of said circular cylindrical surfaces of said guide member and defining a fluid chamber therewith, and
at least one fluid passage formed in said body member and communicating said chamber with said cavity, whereby fluid within said chamber may be transmitted through said passage into said cavity.

2. The invention as set forth in claim 1 which includes
rebound bumper means carried on said piston rod between said piston and said guide member for preventing engagement therebetween during a rebound stroke of the shock absorber.

3. The invention as set forth in claim 1 wherein said combination element is formed with an annular recess around the outer periphery thereof, and which includes a retaining disc disposed adjacent the axially outer side of said guide member, said retaining disc having an inner peripheral portion nestingly received within said recess for securing said element in its operative position on the shock absorber, and said disc having an outer peripheral portion secured to the shock absorber at the same general location at where said guide and housing members are secured to one another.

4. The invention as set forth in claim 1 wherein said housing member is fixedly secured to the radially outermost of said surfaces and extends generally axially downward therefrom.

5. The invention as set forth in claim 1 wherein said housing member is secured to the radially innermost of said surfaces, and which includes a second cylindrical housing member arranged coaxially of said first-mentioned housing member and spaced radially outwardly therefrom and secured to the radially outermost of said surfaces.

6. The invention as set forth in claim 1 wherein said fluid passage is formed in said body as a position communicating with said cavity between said first and second circular cylindrical surfaces.

7. The invention as set forth in claim 1 wherein said housing member is secured to the radially innermost of said surfaces, and which includes a second cylindrical housing member arranged coaxially of said firstmentioned housing member and spaced radially outwardly therefrom and secured to the radially outermost of said surfaces.

8. The invention as set forth in claim 1 wherein said passage is formed in said body member at a position located radially inwardly from the radially innermost of said surfaces.

9. The invention as set forth in claim 8 wherein said housing member is secured to the radially innermost of said surfaces, and which includes a second cylindrical housing member arranged coaxially of said firstmentioned housing member and spaced radially outwardly therefrom and secured to the radially outermost of said surfaces.

* * * * *